(12) United States Patent  
Yagnik et al.

(10) Patent No.: US 8,774,509 B1  
(45) Date of Patent: Jul. 8, 2014

(54) METHOD AND SYSTEM FOR CREATING A TWO-DIMENSIONAL REPRESENTATION OF AN IMAGE BASED UPON LOCAL REPRESENTATIONS THROUGHOUT THE IMAGE STRUCTURE

(75) Inventors: Jay Yagnik, Santa Clara, CA (US); Douglas Eck, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 23 days.

(21) Appl. No.: 13/410,199

(22) Filed: Mar. 1, 2012

(51) Int. Cl.
*G06K 9/00* (2006.01)

(52) U.S. Cl.
USPC .......................... 382/170; 348/161; 382/218

(58) Field of Classification Search
USPC ........... 348/161; 382/103, 165, 170, 190, 218
See application file for complete search history.

(56) References Cited

U.S. PATENT DOCUMENTS

| | | | |
|---|---|---|---|
| 7,218,796 B2 * | 5/2007 | Bishop et al. | 382/299 |
| 7,657,089 B2 * | 2/2010 | Li et al. | 382/170 |
| 8,330,819 B2 * | 12/2012 | Jung et al. | 348/161 |
| 8,503,792 B2 * | 8/2013 | Zhang et al. | 382/195 |
| 2009/0016610 A1 * | 1/2009 | Ma et al. | 382/195 |
| 2011/0286628 A1 * | 11/2011 | Goncalves et al. | 382/103 |
| 2012/0321175 A1 * | 12/2012 | Hedau et al. | 382/159 |

OTHER PUBLICATIONS

Yagnik, Jay, et al., "The Power of Comparative Reasoning," http://www.cs.utoronto.ca~dross/YagnikStrelowRossLin_ICCV2011.pdf 8 pages, Nov. 2011.

Lyon, Richard F., "Machine Hearing: An Emerging Field," IEEE Signal Processing Magazine, 9 pages, Sep. 2010.

* cited by examiner

*Primary Examiner* — Gregory M Desire
(74) *Attorney, Agent, or Firm* — Lowenstein Sandler LLP

(57) ABSTRACT

A system computes a vectorial representation for each of a set of initial patches in an image and compares the vectorial representation for each initial patch with vectorial representations of nearby patches. Each nearby patch is within a distance from an initial patch. The system applies an ordinal coding algorithm on the comparison results between the vectorial representations for the initial patches and vectorial representations of nearby patches to generate a two-dimensional representation of the image indicating a repeating pattern within the image.

21 Claims, 7 Drawing Sheets

METHOD AND SYSTEM FOR CREATING A TWO-DIMENSIONAL REPRESENTATION OF AN IMAGE BASED UPON LOCAL REPRESENTATIONS THROUGHOUT THE IMAGE STRUCTURE

TECHNICAL FIELD

Embodiments of the present invention relate to representations of an image and, more particularly, to a technique of creating a two-dimensional representation of an image based upon local representations throughout the image structure.

BACKGROUND

A digital image is generally a representation of a real image (e.g., a photograph) in a format which may be processed by a computer system. A digital image generally comprises picture elements (e.g., pixels) arranged in a two-dimensional array. Information associated with the location and color of each pixel may be stored and/or used by a computer system to display the digital image. Image analysis systems are designed to extract information from an image and determine properties of the image from the extracted information. Many conventional data coding schemes uncover, for example, texture and shape information, for small areas of an image and create a histogram of the codewords for the small areas of the image. However, such systems may be resource and time intensive due to the significant number of small areas being encoded and represented in the histogram.

SUMMARY

In one embodiment, a computing device computes a vectorial representation for each of a set of initial patches in an image and compares the vectorial representation for each initial patch with vectorial representations of nearby patches. Each nearby patch is within a distance from an initial patch. The computing device applies an ordinal coding algorithm on the comparison results between the vectorial representations for the initial patches and vectorial representations of nearby patches to generate a two-dimensional representation of the image indicating a repeating pattern within the image.

In one embodiment, the ordinal coding algorithm is a Winner-Take-All algorithm. In one embodiment, the computing device compares the vectorial representation for each initial patch with vectorial representations of nearby patches by creating a second vectorial representation for each initial patch. The second vectorial representation is an auto-correlation vector that represents the comparison of the vectorial representation for the corresponding initial patch with vectorial representations of nearby patches.

In one embodiment, the computing device applies an ordinal coding algorithm on comparison results by generating a codebook using a Winner-Take-All algorithm or a k-means clustering algorithm on the auto-correlation vectors and generating a vocabulary for the image using the codebook. The vocabulary includes codewords for the auto-correlation vectors to represent large region information for the image. In one embodiment, the computing system generates a histogram of the vocabulary of the auto-correlation vectors as the two-dimensional representation of the image. In one embodiment, the vectorial representations are based on texture features or shape features. In one embodiment, the computing device ranks an image and/or classifies an image based on the two-dimensional representation of the image to provide image retrieval and/or an image recommendation.

In additional embodiments, methods for performing the operations of the above described embodiments are also implemented. Additionally, in embodiments of the present invention, a non-transitory computer readable storage medium stores methods for performing the operations of the above described embodiments.

BRIEF DESCRIPTION OF THE DRAWINGS

Various embodiments of the present invention will be understood more fully from the detailed description given below and from the accompanying drawings of various embodiments of the invention.

DETAILED DESCRIPTION

A system and method for representing a large region structure in an image using auto-correlation of small region information is described. For example, a repeating pattern indicating a texture and/or shape of an image can be identified based upon local representations in the image that are used to represent larger regions throughout the image structure. For instance, a small region of an image of a bouquet of roses may indicate a shape of a single rose. Whereas, a large region of the same image may indicate a shape pattern of roses in a bouquet. In another example, a small region of an image may indicate a grass texture. Whereas, a large region of the same image may indicate a texture pattern of grass in a large field.

In an embodiment, the system (or method) divides an image into small regions. The small regions are also hereinafter referred to as "patches." The system computes a vectorial representation for each patch in an image. For each patch, the system auto-correlates the vectorial representation to create a second vectorial representation for each patch. The system creates a second vectorial representation by comparing the vectorial representation for the patch with the vectorial representations of nearby patches. The nearby patches can be within a distance D for a corresponding patch. The system creates a codebook using the second vectorial representations of each patch. A codebook as referred to herein is a finite set of vectors. Each vector in the codebook is called a code vector or a codeword. The codewords in a codebook are also referred to herein as a vocabulary. The codewords in the codebook represent large region information of a repeating pattern, such as texture and/or shape, based on small region feature representations. For example, the codewords may represent a shape of a rose repeating in a large region of an image.

By providing representations of a large region structure for images (e.g., a representation of the texture and/or shape in an image), various embodiments of the invention greatly improve the quality of image based systems, such as content-based image recommendation systems, image retrieval systems, etc. Embodiments may be used for image retrieval services, image classification services, etc. For example, embodiments can identify images that have a large region texture and/or shape that is similar to a particular image.

Figure 1:
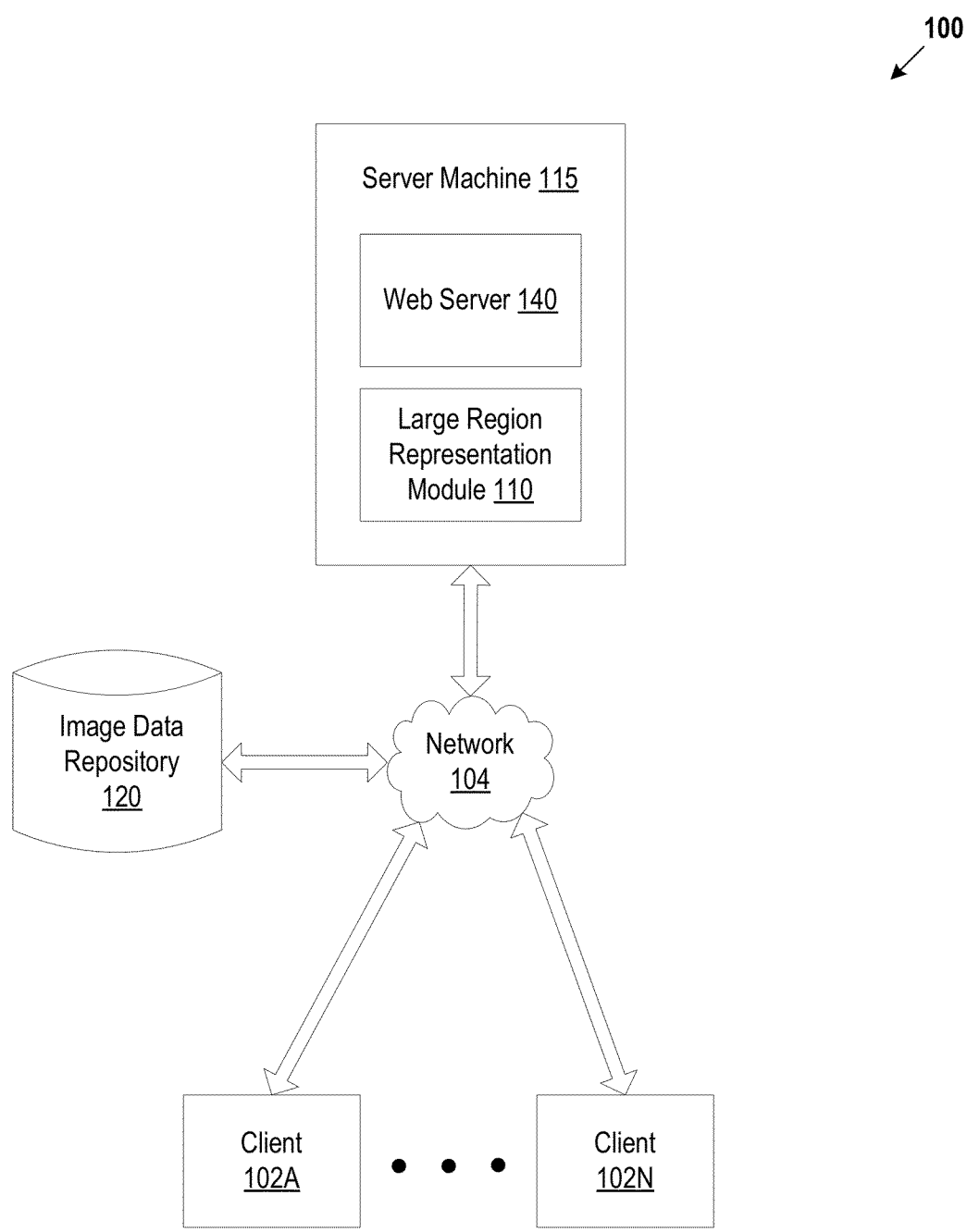
FIG. 1 illustrates exemplary system architecture, in accordance with various embodiments of the present invention.

FIG. 1 illustrates exemplary system architecture 100 in which embodiments can be implemented. The system architecture 100 includes a server machine 115, an image data repository 120 and client machines 102A-102N connected to a network 104. Network 104 may be a public network (e.g., the Internet), a private network (e.g., a local area network (LAN) or wide area network (WAN)), or a combination thereof.

Image data repository 120 is a persistent storage that is capable of storing image data. As will be appreciated by those skilled in the art, in some embodiments image data repository 120 might be a network-attached file server, while in other embodiments image data repository 120 might be some other type of persistent storage such as an object-oriented database, a relational database, and so forth. The image data stored in the image data repository 120 may include user generated content that is uploaded by client machines 102A-102N. The image data may additionally or alternatively include content provided by service providers. Images may be added to the image data repository 120 set as discrete files (e.g., joint photographic experts group (JPEG) files, graphics interchange format (GIF) files, portable network graphics (PNG) files, etc.) or as components of a single compressed file (e.g., a zip file).

The client machines 102A-102N may be personal computers (PC), laptops, mobile phones, tablet computers, or any other computing devices. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may issue image data queries to the web server or may browse image data that have previously been classified. The client machines 102A-102N may also upload image data to the web server for storage and/or classification.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. Server machine 115 includes a web server 140 and a large region representation module 110. In alternative embodiments, the web server 140 and large region representation module 110 may run on different machines.

Web server 140 may serve image data from image data repository 120 to clients 102A-102N. Web server 140 may receive image data queries and perform searches on the image data in the image data repository 120 to determine image data that satisfy the image data search query. Web server 140 may then send to a client 102A-102N those image data that match the search query. In one embodiment, web server 140 provides an application that manages image data. For example, the application can be a product cataloging application, an interior design web application, a retail store web application, an art application an archaeology application, an architecture/engineering design application, geographic information system, weather forecasting system, medical imaging application, trademark application, etc. In one embodiment, an application is provided by and maintained within a service provider environment and provides services relating to image data. For example, a service provider maintains web servers 140 to provide product catalog services, such as product recommendation services, etc.

In order for the image data repository 120 to be searchable, the image data in the image data repository 120 should be classified. In one embodiment, the image data is indexed and the index of the data can be used to classify the data. The image data repository 120 can include a number of image data items. In one embodiment, large region representation module 110 generates a two-dimensional (2-D) representation of each of the images in the image data repository 120 that represents large region information, such as texture and/or shape in an image, and can use the 2-D representations to index the image data. The image data may then be searched based on the 2-D representations.

A 2-D representation is a representation of large region(s) in an image based on information of small regions in the image. The large region representation module 110 can use information from patches of an image to generate the 2-D representation of large region information for the image. The large region representation module 110 can auto-correlate data for a patch with data of other nearby patches within a distance from the corresponding patch. The large region representation module 110 can generate 2-D representations of large region information for all of the images in the data store 130. The large region representation module 110 can store the 2-D representations in the data store 130.

A web server 140 can access the 2-D representations generated by the large region representation module 110 to provide a service related to image data, such as an image service. For example, a user may wish to retrieve images that have a particular texture pattern. The user can send a request to the web server 140 via a client 102A to identify images that have a texture pattern that is similar to a particular image. The web server 140 can use the 2-D representation of the particular image that is stored in the image data repository 120 to identify images in the image data repository 120 that have similar large region information of the particular texture as the particular image based on the 2-D representations. The web server 140 can rank images in the image data repository 120 based upon the query image using the 2-D representation for the images. The web server 140 can use the 2-D representation of the query image to query the image data repository 120 for similar regions in images based on distance of the vector (e.g., histogram) of the query image against the vectors (e.g., histograms) of the other images.

Figure 2:
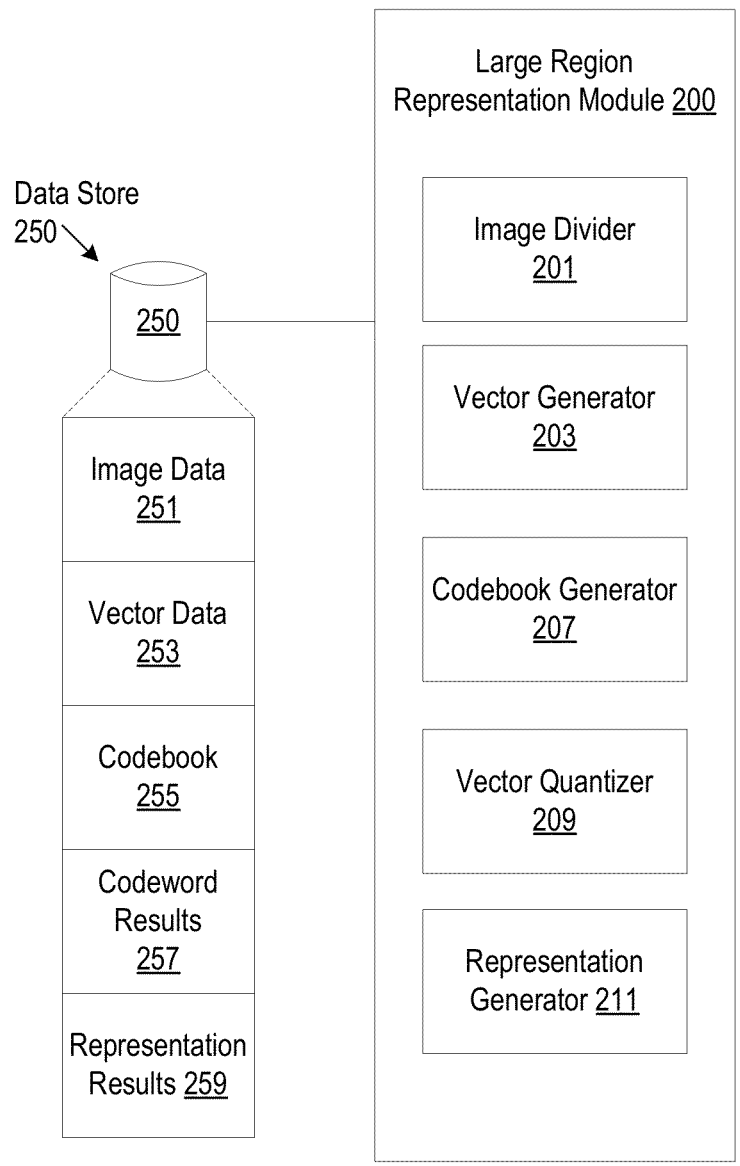
FIG. 2 is a block diagram of a large region representation module, in accordance with an embodiment.

FIG. 2 is a block diagram of a large region representation module 200, in accordance with one embodiment of the present invention. The large region representation module 200 includes an image divider 201, vector generator 203, codebook generator 207, vector quantizer 209, and a representation generator 211. Note that in alternative embodiments, the functionality of one or more of the image divider 201, vector generator 203, codebook generator 207, vector quantizer 209, and a representation generator 211 may be combined or divided.

The large region representation module 200 can be coupled to a data store 250 that stores image data 251 (e.g., image data stored in repository 120 in FIG. 1). The image divider 201 can define regions in the image items in the data store 250. The regions are hereinafter referred to as "patches" and "small regions." The image can be divided into any number of patches that are the same size and/or different sizes. The patch size and the number of patches in an image can be user-defined. The patch size can be based on pixels. An image can be two-dimensional having an X-plane and a Y-plane and a patch can be represented based on x-coordinates and y-coordinates in the planes. A patch can be referred to as a reference patch (x,y).

The vector generator 203 can compute a first vectorial representation for each patch in a set of patches in an image. In one embodiment, the set of patches includes all of the patches in an image. In another embodiment, the set of patches is a subset of all of the patches in the image (e.g., every $10^{th}$ patch, every other patch, non-overlapping patches, etc.). A vectorial representation is also referred to as first feature vector. The first feature vector can be represented as $U_r[x,y]=[U_x,U_y]$, where r can represent a number identifier of a reference patch, and x and y can be coordinate identifiers for the reference patch. For example, patch 250 of an image can have a first feature vector $U_{250}[x,y]=[U_x,U_y]$. A first feature vector can be a k-dimensional vector, where k is a value based on the feature set (e.g., texture feature set, shape feature set). The vector generator 203 can extract features at each patch (x,y) and compute the feature vector (e.g., $U_r[x,y]=[U_x,U_y]$) for the corresponding patch (x,y). The feature vectors can be stored as part of vector data 253 in the data store 250. There are different types of features that can be extracted from an image, such as, and not limited to, texture features and shape features. A variety of techniques can be used for measuring texture, such as, and not limited to, co-occurrence matrices, Fractals, Gabor filters, variations of wavelet transform. A variety of techniques can be used for measuring shape, such as, and not limited to, geometric moments and the angular radial transform. The Gabor filter based features can include properties, such as, illumination, rotation, scale, and translation.

The vector generator 203 can compute a second vectorial representation for each patch a set of patches in an image. A second vectorial representation is also referred as an auto-correlation vector and a second feature vector. The auto-correlation vector stores the correlation between a first feature vector $U_r[x,y]$ for a reference patch (x,y) and the first feature vectors $U_n[x,y]$ for the nearby patches within a distance D from a point in the reference patch (x,y). Auto-correlation of a first feature vector, $U_r[x,y]$, is the cross-correlation of the first feature vector $U_r[x,y]$ with itself as a function of the x-y dimension. The auto-correlation uncovers repeating patterns to identify large region information, such as texture repeating patterns within a larger region within an image. For example, auto-correlation of the vectors can progressively identify vectors that are similar and dissimilar to each other within an image, which can be used to identify a texture and/or shape for the image. A second feature vector, $V_r[x,y]$, is the large region descriptor for the corresponding initial patch. For example, the second feature vector $V_r[x,y]$ stores the correlation between a first feature vector $U_r[x,y]$ and the first feature vectors for nearby patches that are within a distance D in the XY-plane from the corresponding initial patch. An auto-correlation vector computed at reference patch (x,y) can be represented as $V_r[x,y]=[V_1, V_2, \ldots, V_k]$. An auto-correlation vector can be a k-dimensional vector, where k is a value based on the number of nearby patches. The auto-correlation vectors can be stored as part of vector data 253 in the data store 250. One embodiment of generating an auto-correlation vector for a patch is described in greater detail below in conjunction with FIG. 3.

The codebook generator 207 can generate a codebook for the auto-correlation vectors. A codebook for the auto-correlation vectors can be represented by a sparse vector of codewords $C=[c_0, c_1, \ldots, c_{\mu-1}]$, C contains $\mu$ codewords. A codeword in the codebook can be represented by $v_i$. In one embodiment, the codebook generator 207 generates sets the number of codewords for the codebook as 1000 codewords (a 1000 word vocabulary). In one embodiment, the codebook generator 207 uses an ordinal coding algorithm, such as a Winner-Take-All (WTA) algorithm, to build the codebook. In one embodiment, the codebook generator 207 considers a set of groups of auto-correlation dimension that is generated from random permutations. For each group, the codebook generator 207 generates a codeword that indentifies which auto-correlation dimension within the group has the highest value. The ensemble of these codewords forms a codebook (e.g. a 1000 codeword). One embodiment of generating a codebook using WTA is described in greater detail below in conjunction with FIG. 5 and FIG. 6. In another embodiment, the codebook generator 207 generates a codebook using WTA features with a vector quantization algorithm, such as a k-means clustering algorithm. The generated codebook can be stored as part of codebooks 255 in the data store 250.

The vector quantizer 209 can use the codebook to identify the closest codeword in the corresponding codebook for each auto-correlation vector to create a set of codewords (vocabulary) for the image. The vector quantizer 209 can take an input vector (e.g., $U_r[x,y]$) and evaluate the Euclidean distance between the input vector and each codeword in the codebook. When the vector quantizer 209 determines the closest codeword, the vector quantizer 209 stores the index of that codeword or the actual codeword as codeword results 257 in the data store 250.

The representation generator 211 can create a 2-D representation of the image based on the codewords for the auto-correlation vectors for the patches in the image. In one embodiment, the representation generator 211 creates a histogram of the codewords for the auto-correlation vectors for the set of patches for the image as the 2-D representation. A histogram is a representation of the distribution of data. For example, each codeword in a histogram corresponds to an auto-correlation vector for a patch in the image and the histogram describes the number of times each codeword occurs within the image. For instance, the codeword $c_{503}$ from the codebook occurs 3 times in patches in the image and the codeword $c_{781}$ occurs 4 times in patches in the image. The histogram can be a vector. In one embodiment, a vector representation of the histogram has a thousand dimensions. The representation generator 211 can create a 2-D representation for each image in the image data 251 in the data store 250. The representation generator 211 can store the histograms in the representation results 259 in the data store 250.

Figure 3:
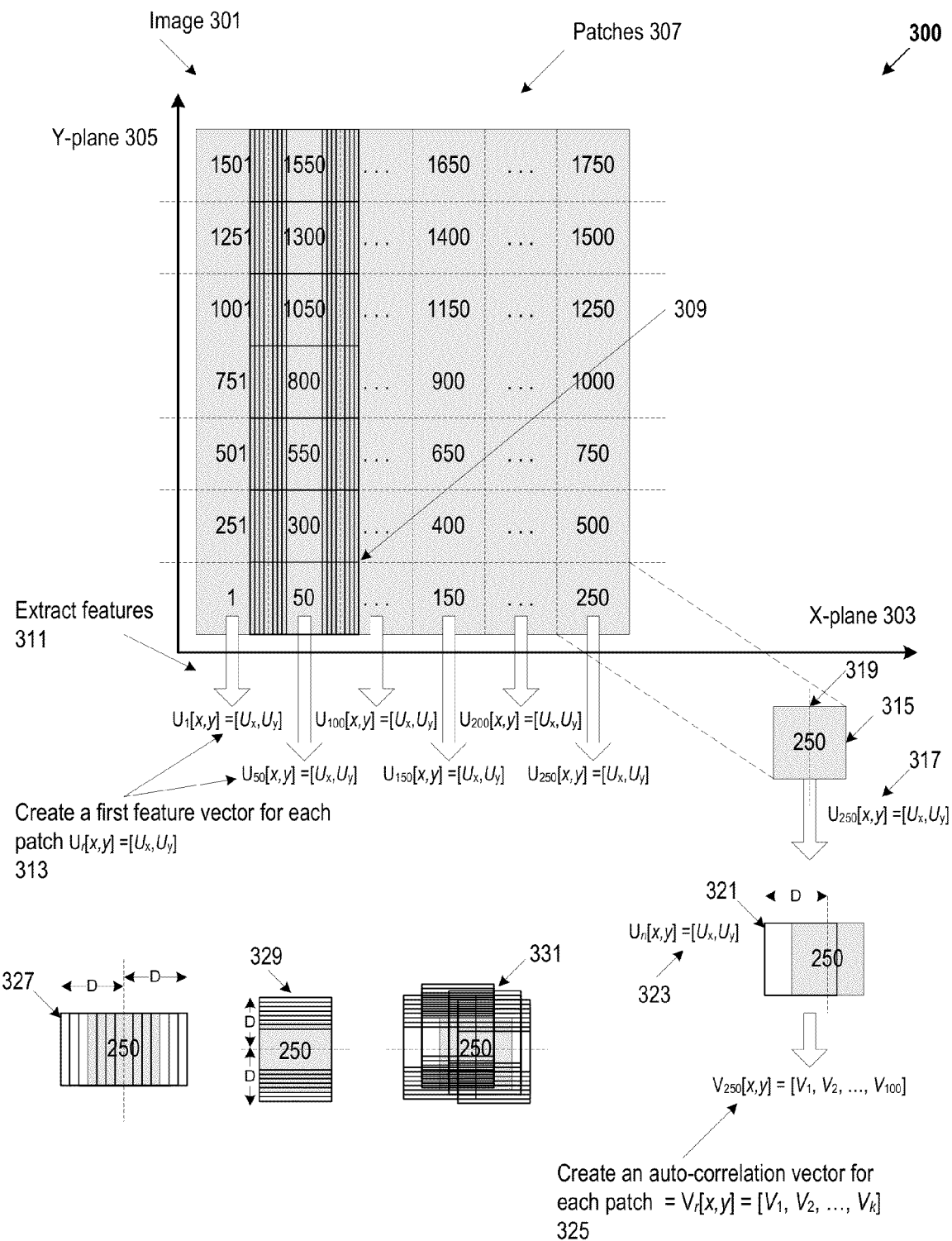
FIG. 3 is a block diagram illustrating the generation of a two-dimensional (2-D) representation that represents large region information of the image based on small region information of the image, in accordance with an embodiment.

FIG. 3 is a block diagram 300 of one embodiment for generating an image representation that represents large region information of the image based on small region information of the image. The image 301 is in an X-plane 303 and a Y-plane 305 and is divided into small patches 307. The image 301 can be divided into any number of patches 307. For example, for brevity and simplicity, block diagram 300 shows patches 1-1750 for image 301. The patches 307 can be patches that overlap horizontally, for example, as illustrated in patches 309, and can overlap vertically, in any direction, and combination of directions. Image features, such as texture features, are extracted 311 for each patch 307 in a set of patches and a first feature vector is created 313 for each patch 307 in the set of patches using the extracted features 311 for the corresponding patch. For example, a set of patches includes all of the patches in the image. In another example, the set of patches includes a subset of patches, such as a selection of non-overlapping patches, in the image.

For a reference patch (x,y) in the set of patches, the first feature vector can be represented at $U_r[x,y]=[U_x, U_y]$. In one embodiment, $U_r[x,y]$ is computed by extracting Gabor features from each (x,y) point in the reference patch, and computing the mean and variance of elements in the feature vector over all points in the patch to form the first feature vector $U_r[x,y]$ for a patch as a 2 mn-by-1 vector.

For each patch in the set, a second feature vector, $V_r[x,y]=[V_1, V_2, \ldots, V_k]$ is computed 325. The number of dimensions k in an auto-correlation feature vector $V_r[x,y]=[V_1, V_2, \ldots, V_k]$ can be based on the number of nearby patches within the distance D from the reference patch. The distance D can be a user-defined value. The distance D between two points of the XY-plane can be computed using a distance formula. For example, the distance between $(x_1, y_1)$ and $(x_2, y_2)$ is given by Equation (1):

$$D = \sqrt{(x_2 - x_1)^2 + (y_2 - y_1)^2} \quad (1)$$

For example, for reference patch 250 (315), there are 100 nearby patches within a distance D from a vertical center 319 of reference patch 250 (315), and the auto-correlation feature vector $V_{250}[x,y]=[V_1, V_2, \ldots, V_k]$ for patch 250 (315) can have k=100 dimensions. The auto-correlation feature vector for patch 250 can be represented as $V_{250}[x,y]=[V_1, V_2, \ldots, V_{100}]$. $V_{250}[x,y]$ is the large region descriptor associated with a reference patch 250 (x,y) and $V_k$ be the k-th value in $V_{250}[x,y]=[V_1, V_2, \ldots, V_k]$.

$V_1$=the correlation (e.g., dot product) between the vector $U_r[x,y]$ of the reference path and the vector $U_1[x,y]$ of the first nearby patch.
. . .
$V_{50}$=the correlation (e.g., dot product) between the vector $U_r[x,y]$ of the reference path and the vector $U_{50}[x,y]$ of the 50th nearby patch
. . .
$V_{100}$=the correlation (e.g., dot product) between the vector $U_r[x,y]$ of the reference path and the vector $U_{100}[x,y]$ of the 100th nearby patch.

There can be a configurable number of nearby patches within a distance D from a reference patch. For example, there may be a 500 nearby patches 327 within a distance D from a vertical center of reference patch 250. In another example, there may be 1000 nearby patches 329 within a distance D from a horizontal center of reference patch 250. In another example, there may be 1500 nearby patches 331 within a distance D in any combination of directions from a point (e.g., center point) of reference patch 250.

Figure 4:
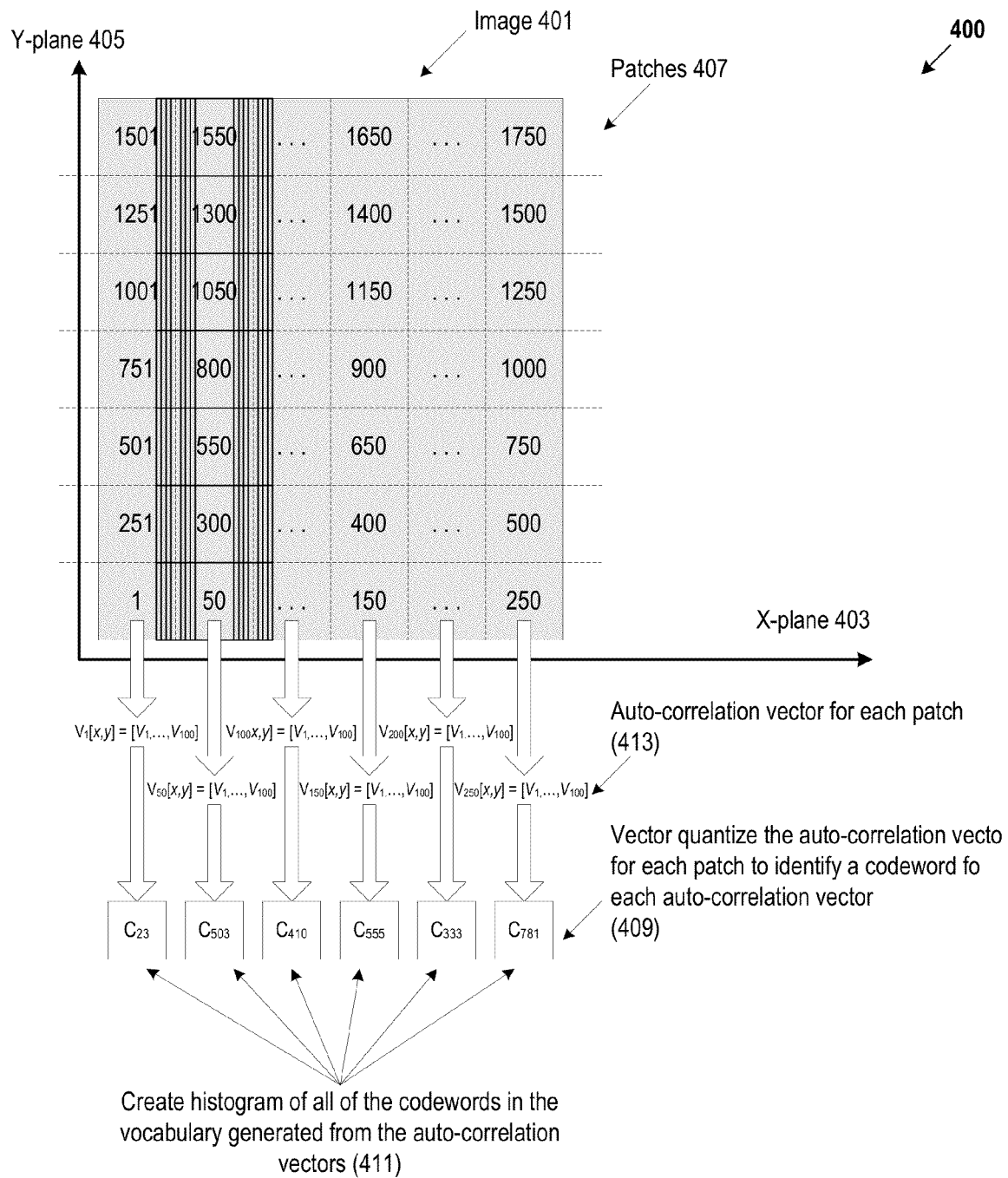
FIG. 4 is a block diagram illustrating the generation of a histogram of codewords of the auto-correlation vectors as a 2-D representation of an image, in accordance with an embodiment.

FIG. 4 is a block diagram 400 of one embodiment for generating a histogram of codewords of the auto-correlation vectors as a 2-D representation of an image. A second feature vector (auto-correlation vector), $V_r[x,y]=[V_1, V_2, \ldots, V_k]$ 413 is computed for each patch 407 in a set of patches (e.g., every $10^{th}$ patch) in the image 401. A WTA algorithm is applied to the auto-correlation vectors 413 to generate a codebook (e.g., a 1000 codeword codebook). In one embodiment, an auto-correlation vector is computed for all of the patches in an image and a codebook is generated by applying the WTA algorithm using the auto-correlation vectors for all of the patches.

Each auto-correlation vector in the set of patches is vector quantized 409 to identify a closest matching codeword in the codebook for the patch to create a vocabulary for the image. For instance, the second vectorial representations for each patch are vector quantized using the codebook to assign the closest matching codeword from the 1000 codewords in the codebook to a patch. For example, patch 1 is assigned codeword $c_{23}$ from the codebook, patch 50 is assigned codeword $c_{503}$, patch 100 is assigned codeword $c_{410}$, patch 150 is assigned codeword $c_{555}$, patch 200 is assigned codeword $c_{333}$, patch 250 is assigned codeword $c_{781}$, etc. A 2-D representation 411 of the image 401 is generated by generating a histogram of the vocabulary generated from auto-correlation vectors to represent the repeating pattern in the structure of the image. The histogram is a vector that may have a thousand dimensions. For example, the histogram for an image identifies that the codeword $c_{23}$ occurred 124 times in the image, the codeword $c_{503}$ occurred 8 times in the image the codeword $c_{410}$ occurred 52 times in the image, etc.

Figure 5:
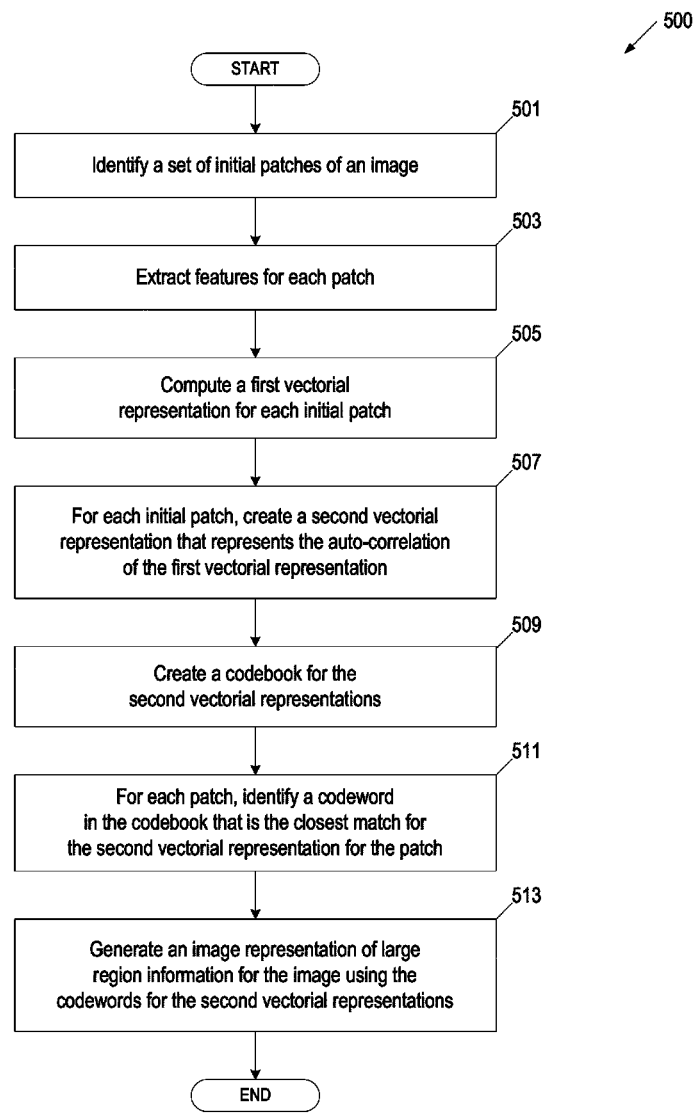
FIG. 5 is a flow diagram illustrating an embodiment for a method of generating a 2-D representation of large region information for an image using small region information of the image.

FIG. 5 is a flow diagram of an embodiment of a method 500 for generating a 2-D representation of large region information for an image using small region information of the image. The method 500 is performed by processing logic that may comprise hardware (circuitry, dedicated logic, etc.), software (such as is run on a general purpose computer system or a dedicated machine), or a combination of both. In one embodiment, the method 500 is performed by the server machine 115 of FIG. 1. The method 500 may be performed by a large region representation module 110 running on server machine 115 or another machine.

At block 501, processing logic identifies a set of initial regions (patches) of an image. Processing logic can divide an image into patches that are the same and/or different sizes. For example, processing logic creates B×B patches in an image. In one embodiment, the set of patches includes all of the patches in an image. In another embodiment, the set of patches is a subset of all of the patches in the image (e.g., every $10^{th}$ patch, every other patch, non-overlapping patches, etc.).

At block 503, processing extracts features (e.g., texture features, shape features) for each initial patch in the set and computes a first vectorial representation (first feature vector) for each initial patch in the set to describe image content (e.g., texture, shape) within that patch at block 505. A first feature vector computed at a reference initial patch (x,y) can be represented as $U_r[x,y]$. Processing logic can extract a set of features, such as a set of texture features, a set of shape features, etc. An example of texture features can include, and is not limited to, Gabor features. In one embodiment, processing logic extracts texture features, such as Gabor features, from each point in the patch and computes the mean and variance of elements in the feature vector over all points in the patch to form a 2 mn-by-1 regional vectorial representation.

At block 507, for each initial patch, processing logic creates a second vectorial representation (also referred to as second feature vector or auto-correlation vector), $V_r[x,y]$, that represents the auto-correlation of the first feature vector, $U_r[x,y]$, for the reference patch within a distance D from the corresponding reference patch. Processing logic can use a vector auto-correlation function, such as computing a dot-product of the first feature vector for a particular patch with the first feature vectors of nearby patches within a distance D, to compute $V_r[x,y]$. For two 2-D vectors, $U_n[x,y]=[U_x,U_y]$ and $V_n[x,y]=[V_x,V_y]$, the dot product is $U \times V = U_x * V_y - U_y * V_x$. Processing logic identifies the parameters for the auto-correlation using the configuration data. The auto-correlation can be based on a number of nearby patches within a distance D from a corresponding reference patch. The configuration data can specify the number of nearby patches to use for the auto-correlation and the distance D to use for the auto-correlation. The parameters can be user defined values.

Figure 6:
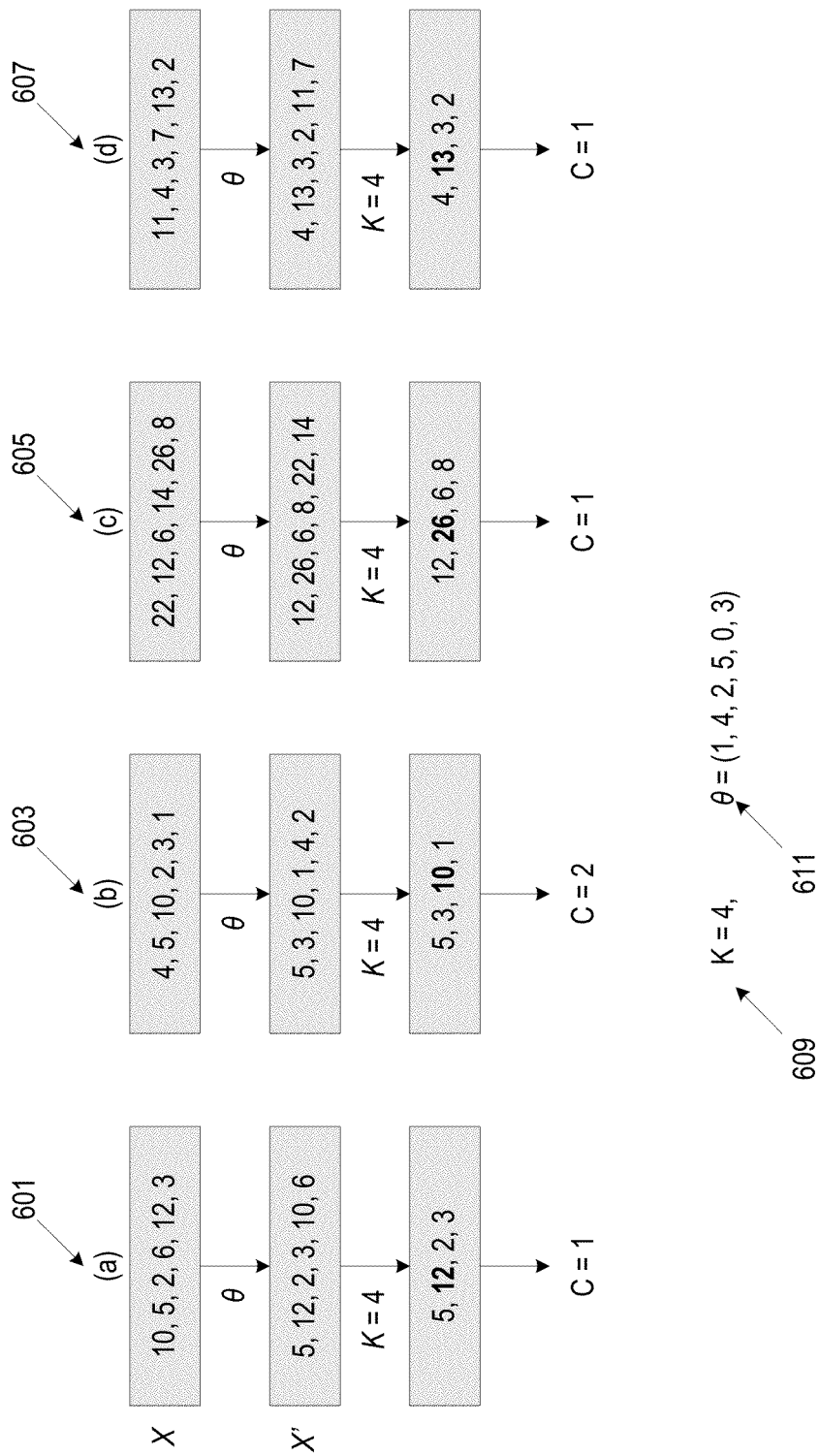
FIG. 6 is a block diagram of an exemplary application of the Winner-Take-All algorithm.

At block 509, processing logic creates a codebook for the second vectorial representations (auto-correlation vectors) using an ordinal coding algorithm to encode the second vectorial representations for the patches, according to some embodiments. In another embodiment, processing logic generates the codebook using a Winner-Take-All (WTA) algorithm. In another embodiment, processing logic generates the codebook using WTA features with a vector quantization algorithm, such as a k-means clustering algorithm. The WTA hash is a sparse embedding method that transforms the input feature space into binary codes such that Hamming distance in the resulting space closely correlates with rank similarity measures. In vector analysis, precise values of each feature dimension (e.g., values in $V_r[x,y]$) are often not important. The WTA algorithm transforms the vector representations (e.g., $V_r[x,y]$) to identify which values in the representations are higher and which ones are lower to create a ranking over these values. FIG. 6 is a block diagram of an exemplary application of the WTA algorithm to four example input vectors 601,603,605,607. The input for the WTA algorithm is set of $\mu$ permutations $\Theta$, window size K, input vector X. The output of the WTA algorithm is sparse vector codes $C_X$. For each permutation $\theta_i$ in $\Theta$, processing logic permutes elements of X according to $\Theta_i$ to get X', initializes $i^{th}$ sparse code $c_{xi}$ to 0, and sets $c_{xi}$ to the index of the maximum value in X'(1 ... K). For j=0 to K−1, if X'(j)>X'($c_{xi}$) then $c_{xi}$=j. The resulting codebook is $C_X=[c_{x0}, c_{x1}, \ldots, c_{x\mu-1}]$, C contains $\mu$ codewords, each taking a value between 0 and K−1. The WTA algorithm permutes the input feature vectors, takes the first K components from the permuted vectors, and outputs the index of the maximum component. The hashes corresponding to different permutations can be combined into an output hash vector. For example, the input vectors (a, b, c, d) are 6-dimensional input vectors, K=4 (609), and $\theta$=(1, 4, 2, 5, 0, 3) (611). X in 601 and 603 are unrelated and result in different output codes, 1 and 2 respectively. X in 605 is a scaled and offset version of 601 and results in the same code as 601. X in 607 has each element perturbed by 1 which results in a different ranking of the elements, but the maximum of the first K elements is the same, again resulting in the same code.

Returning to FIG. 5, codebooks of different sizes can be generated. The codebook size is a configurable value. In one embodiment, the size is set as 1000 codewords. A set of groups of vector dimension that is generated from random permutations can be considered. For example, in creating the codebook, a set of groups of $V_r[x,y]$ generated from random permutations can be considered. For each group, a code that indentifies which dimension within the group has the highest value is generated. The WTA algorithm can be iteratively applied until an ensemble of 1000 codewords is identified to form the codebook.

At block 511, for each patch in the set, processing logic identifies a closest matching codeword in the codebook for the second vectorial representation (auto-correlation vector) for the patch to create a vocabulary for the image. Processing logic can vector quantize the auto-correlation vector for the patch to identify a codeword in the codebook for the auto-correlation vector. Processing logic can take an input vector (e.g., auto-correlation vector) and evaluate the Euclidean distance between the input vector and each codeword in the codebook.

At block 513, processing logic generates an image representation of the large region information for the image using the codewords for the second vectorial representations. The image representation can be a 2-D representation. In one embodiment, processing logic generates a histogram of the vocabulary generated from the second vectorial representations (auto-correlation vectors) to represent the repeating pattern in the structure of the image.

Figure 7:
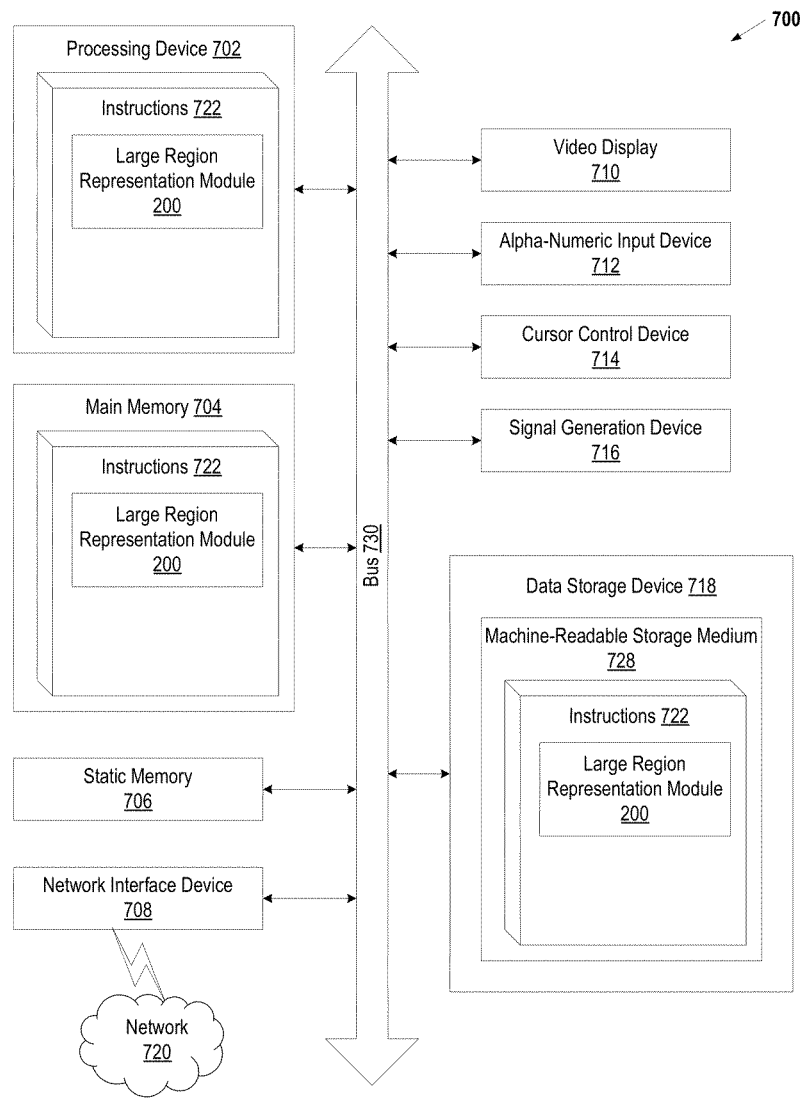
FIG. 7 is a block diagram of an exemplary computer system that may perform one or more of the operations described herein.

FIG. 7 illustrates a diagram of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable storage medium 728 on which is stored one or more sets of instructions 722 (e.g., software) embodying any one or more of the methodologies or functions described herein. The instructions 722 may also reside, completely or at least partially, within the main memory 704 and/or within the processor 702 during execution thereof by the computer system 700, the main memory 704 and the processor 702 also constituting computer-readable storage media. The instructions 722 may further be transmitted or received over a network 720 via the network interface device 708.

In one embodiment, the instructions 722 include instructions for a large region representation module (e.g., large region representation module 200 of FIG. 2) and/or a software library containing methods that call a large region representation module. While the computer-readable storage medium 728 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relates to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   computing, by a computing device, a vectorial representation for each of a plurality of initial patches in an image;
   comparing the vectorial representation for each initial patch in the image with vectorial representations of nearby patches in the image, wherein each nearby patch being compared with a respective initial patch in the image is within a predefined distance from the respective initial patch in the image; and
   applying an ordinal coding algorithm on comparison results between the vectorial representations for the initial patches in the image and vectorial representations of nearby patches in the image to generate a two-dimensional representation of the image indicating a repeating pattern within the image.

2. The method of claim 1, wherein the ordinal coding algorithm is a Winner-Take-All algorithm.

3. The method of claim 1, wherein comparing the vectorial representation for each initial patch with vectorial representations of nearby patches comprises:
   creating a second vectorial representation for each initial patch, wherein the second vectorial representation is an auto-correlation vector that represents the comparison of the vectorial representation for the corresponding initial patch with vectorial representations of nearby patches.

4. The method of claim 3, wherein applying an ordinal coding algorithm on comparison results comprises:
   generating a codebook using at least one of a Winner-Take-All algorithm or a k-means clustering algorithm on the auto-correlation vectors; and
   generating a vocabulary for the image using the codebook, wherein the vocabulary comprises codewords for the auto-correlation vectors to represent large region information for the image.

5. The method of claim 4, further comprising:
   generating a histogram of the vocabulary of the auto-correlation vectors as the two-dimensional representation of the image.

6. The method of claim 1, wherein the vectorial representations are based on at least one of: texture features or shape features.

7. The method of claim 1, further comprising:
   at least one of: ranking an image or classifying an image based on the two-dimensional representation of the image to provide at least one of: image retrieval or an image recommendation.

8. A system comprising:
   a memory; and
   a processing device coupled with the memory and configured to:
   compute a vectorial representation for each of a plurality of initial patches in an image;
   compare the vectorial representation for each initial patch in the image with vectorial representations of nearby patches in the image, wherein each nearby patch being compared with a respective initial patch in the image is within a predefined distance from the respective initial patch in the image; and apply an ordinal coding algorithm on comparison results between the vectorial representations for the initial patches in the image and vectorial representations of nearby patches in the image to generate a two-dimensional representation of the image indicating a repeating pattern within the image.

9. The system of claim 8, wherein the ordinal coding algorithm is a Winner-Take-All algorithm.

10. The system of claim 8, wherein the processing device is to compare the vectorial representation for each initial patch with vectorial representations of nearby patches by:

creating a second vectorial representation for each initial patch, wherein the second vectorial representation is an auto-correlation vector that represents the comparison of the vectorial representation for the corresponding initial patch with vectorial representations of nearby patches.

11. The system of claim 10, wherein the processing device is to apply an ordinal coding algorithm on comparison results by:

generating a codebook using at least one of a Winner-Take-All algorithm or a k-means clustering algorithm on the auto-correlation vectors; and generating a vocabulary for the image using the codebook, wherein the vocabulary comprises codewords for the auto-correlation vectors to represent large region information for the image.

12. The system of claim 11, wherein the processing device is further configured to:

generate a histogram of the vocabulary of the auto-correlation vectors as the two-dimensional representation of the image.

13. The system of claim 8, wherein the vectorial representations are based on at least one of: texture features or shape features.

14. The system of claim 8, wherein the processing device is further configured to:

at least one of: rank an image or classify an image based on the two-dimensional representation of the image to provide at least one of: image retrieval or an image recommendation.

15. A non-transitory computer readable storage medium encoding instructions thereon that, in response to execution by a computer device, cause the computing device to perform operations comprising:

computing a vectorial representation for each of a plurality of initial patches in an image;

comparing, by the computing device, the vectorial representation for each initial patch computing, by a computing device, a vectorial representation for each of a plurality of initial patches in an image;

comparing the vectorial representation for each initial patch in the image with vectorial representations of nearby patches in the image, wherein each nearby patch being compared with a respective initial patch in the image is within a predefined distance from the respective initial patch in the image; and applying an ordinal coding algorithm on comparison results between the vectorial representations for the initial patches in the image and vectorial representations of nearby patches in the image to generate a two-dimensional representation of the image indicating a repeating pattern within the image.

16. The non-transitory computer readable storage medium of claim 15, wherein the ordinal coding algorithm is a Winner-Take-All algorithm.

17. The non-transitory computer readable storage medium of claim 15, wherein comparing the vectorial representation for each initial patch with vectorial representations of nearby patches comprises:

creating a second vectorial representation for each initial patch, wherein the second vectorial representation is an auto-correlation vector that represents the comparison of the vectorial representation for the corresponding initial patch with vectorial representations of nearby patches.

18. The non-transitory computer readable storage medium of claim 17 wherein applying an ordinal coding algorithm on comparison results comprises:

generating a codebook using at least one of a Winner-Take-All algorithm or a k-means clustering algorithm on the auto-correlation vectors; and generating a vocabulary for the image using the codebook, wherein the vocabulary comprises codewords for the auto-correlation vectors to represent large region information for the image.

19. The non-transitory computer readable storage medium of claim 18, wherein the operations further comprise:

generating a histogram of the vocabulary of the auto-correlation vectors as the two-dimensional representation of the image.

20. The non-transitory computer readable storage medium of claim of claim 15, wherein the vectorial representations are based on at least one of: texture features or shape features.

21. The non-transitory computer readable storage medium of claim of claim 15, wherein the operations further comprise:

at least one of: ranking an image or classifying an image based on the two-dimensional representation of the image to provide at least one of: image retrieval or an image recommendation.

* * * * *